United States Patent [19]

Stevens et al.

[11] Patent Number: 4,861,439
[45] Date of Patent: Aug. 29, 1989

[54] METHOD OF IMPROVING THE CAPACITANCE OF ANODIZED ALUMINUM FOIL

[75] Inventors: James L. Stevens, Irmco; Roland F. Dapo, Columbia, both of S.C.

[73] Assignee: North American Philips Corporation, New York, N.Y.

[21] Appl. No.: 215,701

[22] Filed: Jul. 5, 1988

[51] Int. Cl.⁴ .................... C25D 11/16; C25D 11/20
[52] U.S. Cl. ................................ 204/27; 204/28; 204/33; 204/38.3; 29/570.1; 361/509
[58] Field of Search ............... 204/27, 28, 33, 38.3, 204/37.1, 58; 29/570.1

[56] References Cited

U.S. PATENT DOCUMENTS

| | | | |
|---|---|---|---|
| 3,375,413 | 3/1968 | Brill | 361/523 |
| 3,398,067 | 8/1968 | Rattalovich | 204/37.1 |
| 3,612,956 | 10/1971 | Sterling et al. | 361/524 |
| 4,426,260 | 1/1984 | Stevens | 204/33 |
| 4,470,885 | 9/1984 | Randall et al. | 204/29 |
| 4,481,083 | 11/1984 | Ball et al. | 204/38.3 |

FOREIGN PATENT DOCUMENTS 2041647 9/1980 United Kingdom .

Primary Examiner—John F. Niebling
Assistant Examiner—David Ryser
Attorney, Agent, or Firm—Norman N. Spain

[57] ABSTRACT

Capacitance of anodized aluminum foil is increased by treating the foil after etching but before anodizing with an aqueous solution of a salt of valve metal, the oxide of which has a dielectric constant of at least about 20 and heating the foil to convert the salt to an oxide.

15 Claims, 1 Drawing Sheet

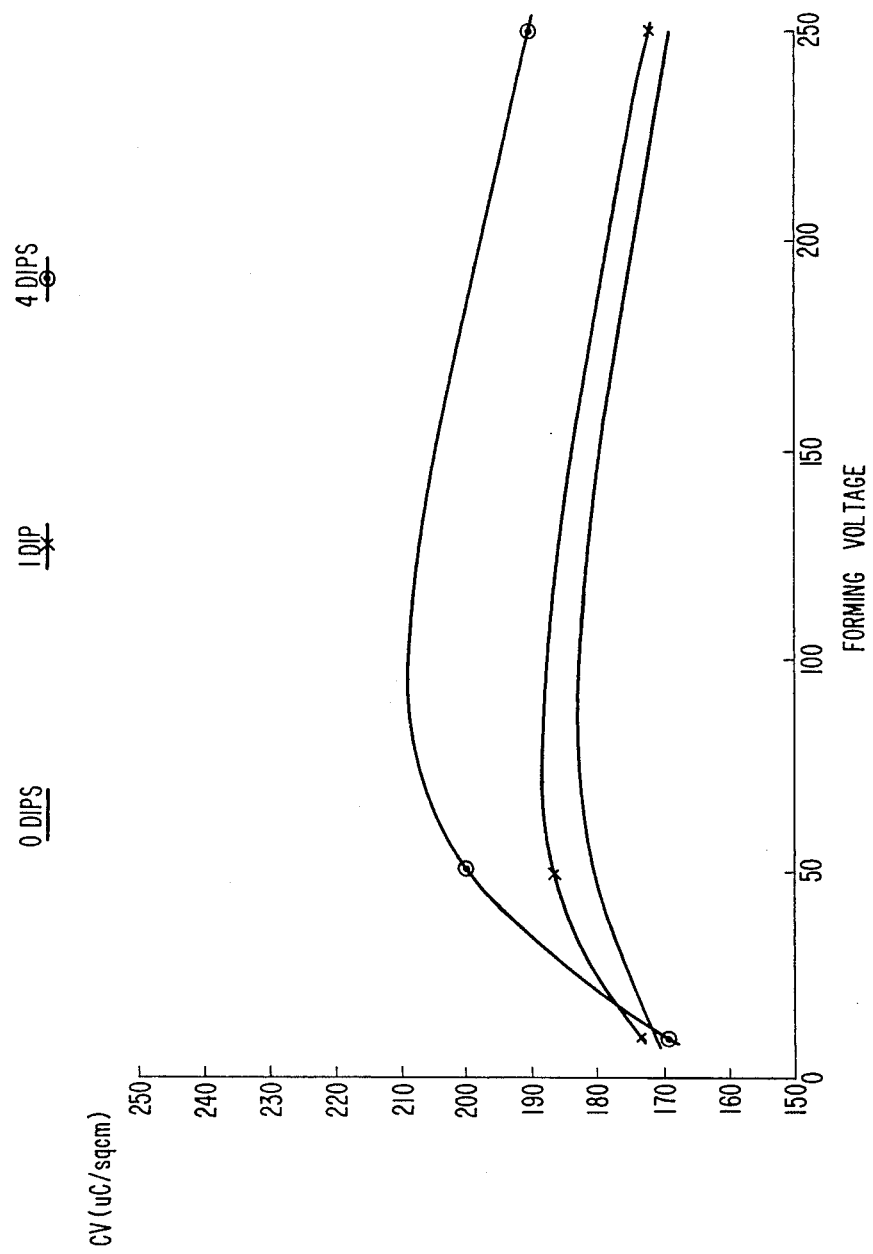

METHOD OF IMPROVING THE CAPACITANCE OF ANODIZED ALUMINUM FOIL

BACKGROUND OF THE INVENTION

This invention relates to a method of increasing the capacitance of anodized aluminum anode foils.

In Japanese Patent 55-69291, a method is disclosed of increasing the capacitance of an anodized aluminum foil by treating the foil before anodization with an organic solvent solution of a metal alkoxide such as titanium methoxide, hydrolyzing the resultant layer of metal oxide by treatment with boiling water, heating this treated layer and anodizing the thus treated layer. As a result the aluminum foil is covered with a layer of titanium dioxide.

A similar method is disclosed in Japanese Patent 80-69291. In this patent use of additional alkoxides of titanium including the isopropoxide is disclosed.

Japanese Patent 60-115215 discloses a method of first anodizing an aluminum foil then coating the anodized aluminum foil with an alcohol solution containing a metal alkoxide such as titanium isopropoxide, then thermally decomposing the coating.

A serious problem with the use of the methods of these references is that these methods require the use of a totally non-aqueous environment. Even the small amount of water that may be present in atmospheric humidity can destroy the alkoxide solutions employed. Such water-free conditions are very difficult to establish and maintain during the continuous production required for the large scale manufacture of the aluminum foils.

It has been found that the adhesion of the oxides such as titanium oxides made by the method of these references to the aluminum foil is not sufficient to prevent lift-off during the forming operation unless extraordinary care is employed.

Additionally, these references do not indicate whether the methods disclosed are applicable to etched aluminum foils.

British Patent 2041647 shows a method of doping a foil before formation or after formation with titanium by use of ion implantation. However, there is no suggestion that the titanium is oxidized so as to form titanium oxide. Additionally, this method is too slow to substantially raise the capacitance of the foil. Further, this method is not applicable to etched foils.

BRIEF SUMMARY OF THE INVENTION

An object of this invention is to provide an improved method for increasing the capacitance of anodized aluminum foils.

This and other objects of the invention will be apparent from the description that follows.

According to the invention, a new and novel method of increasing the capacitance of an anodized aluminum foil that is particularly adapted for use as an anode in an electrolytic capacitor comprises wetting an etched aluminum foil with an aqueous solution of a salt of a valve metal, the oxide of which had a dielectric constant of at least about 20. The resultant wetted foil is heated at a temperature sufficient to dry the foil and convert the salt to the oxide of the metal by dissociation. The foil is then anodized in the usual manner.

BRIEF DESCRIPTION OF THE DRAWING

In the drawing, the sole FIGURE is a graph comparing the capacitance as a function of forming voltage, of aluminum foils without treatment to those having a single or multiple number of treatments with an aqueous solution of a titanium salt.

DETAILED DESCRIPTION OF THE INVENTION

The method of the invention may be carried out with the aqueous solution of any salt of a valve metal the oxide of which has a dielectric constant of at least 20, preferably the salts employed are salts of a metal selected from the group consisting of Ti, Zr, Ta, Nb and W. However best results were achieved with the use of water-soluble titanium salts of a base having a boiling point below 95° C. Of these, the most readily prepared are the aliphatic ammonium salts and these are preferred. Among the salts that may be employed are dimethylammonium titanate, diethylammonium titanate, ethylammonium titanate, n-butylammonium titanate, sec-butylammonium titanate, n-propylammonium titanate and isopropylammonium titanate. Additional examples of salts that may be employed are the other metal analogs of these salts. Preferably the solution contains about 0.001 to 1.00 percent by weight of the salt, most preferably about 0.01%.

Although the etched foil may be treated with salt containing aqueous solution by any known method such as spraying the foil with the solution or by immersing the foil in the solution, the best results are achieved by immersing the foil in the solution for a plurality of times, preferably at least about 4 times.

After each immersion the foil is dried by being heated to about 100° C. and after the last immersion the salt is converted to an oxide by heating in the foil at a temperature of 200° C. to 600° C. depending on the salt employed. For example, for a foil treated with dimethylammonium titanate, conversion of the titanate salt to titanium dioxide is carried out by heating the treated foil in air at a temperature of about 400° C.

Preferably the foils are treated with the solutions a sufficient number of times so as to provide the foil with sufficient oxide to reach incorporation levels of 0.1% to 30% in the aluminum oxide after anodization.

A preferred embodiment of the invention will now be described with reference to the following example and the sole FIGURE of the drawing.

EXAMPLE

A 5 wt% solution of dimethylammonium (DMA) titanate was prepared as follows.

A solution of dimethylamine in water was first prepared by dissolving the amine in DI water. Titanium isopropoxide (TIP) was then added to the amine solution with extremely rapid stirring.

| DI Water | 89.00 wt % |
| Dimethylamine | 3.00 |
| Titanium Isopropoxide (TIP) | 8.00 |

In this preparation, the mole ratio of the dimethylamine to the TIP is 2:1. After all components had been added, the mix was heated to about 70° C. to dissolve as much of the titanium compound as possible. Some hydrous titanium oxide solid is formed as an undesired by-product. This can be removed by decanting the solution, after a short period of standing.

The above solution is used as a stock solution. It would be diluted for use, for example in a 1:500 ratio. At this dilution the DMA titanate is at a concentration of about 0.01% or 100 ppm. The resistivity of this dilution is about 3600 ohm.cm at 85C. It has a pH of 9.5. Aluminum can be formed to a voltage of over 50 V at 85° C. using this composition.

Samples of etched aluminum foil were immersed in solutions prepared according to the example in which the concentration of the DMA titanate was about 0.01% by weight. After each immersion the foils were heated in an oven at about 100° C. to evaporate the solvent and bond the titanate to the foil. After the last immersion the foils were heated in air in an oven to about 400° C. to convert the salt to $TiO_2$.

The foils were then anodized by immersing the foils in a 0.1% ammonium dihydrogen phosphate solution heated to about 90° C., applying a DC forming voltage. The capacitance was determined for each of 18 samples, forming voltages of 10, 50 and 250 volts and zero, one and four dip (or immersion) cycles being employed. Three samples were employed for each combination of dip cycle and forming voltage.

The averages of each of three samples is shown in the sole FIGURE of the drawing which is a graph in which the ordinate is the capacitance-voltage product in uC/sq cm and the abscissa is the forming voltage. The use of the CV product helps correct data for the capacitance depending on forming voltage.

As will be noted, at both forming voltages of 50 and 250 volts increases in capacitance of over 8% were achieved.

Since the method of the instant invention allows the continuous production of anodized anode foil of increased capacitance it results in the more efficient production of those capacitors employing these foils.

While the present invention has been described with reference to particular embodiments thereof, it will be understood that numerous modifications may be made by those skilled in the art without actually departing from the scope of the invention.

What is claimed is:

1. A method for increasing the capacitance of anodized aluminum foil particularly adapted for use as an anode in an electrolytic capacitor, said method comprising:
    (a) wetting an etched aluminum foil with an aqueous solution of a salt of a valve metal, the oxide of which has a dielectric constant of at least about 20,
    (b) heating said wetted foil at a temperature sufficient to dry said foil and convert said salt to said oxide and
    (c) anodizing said thus treated foil.

2. A method for increasing the capacitance of anodized aluminum foil particularly adapted for use as an anode in an electrolytic capacitor, said method comprising:
    (a) wetting an etched aluminum foil with an aqueous solution of a salt of a valve metal selected from the group consisting of Ti, Zr, Ta, Nb and W,
    (b) drying said wetted foil at a temperature sufficient to dry said foil and convert said salt to an oxide and
    (c) anodizing said thus treated foil.

3. The method of claim 2 wherein the foil is wetted with a sufficient amount of the aqueous solution so as to provide the foil with sufficient oxide to reach incorporation levels of 0.1% to 30% in the aluminum oxide after anodization.

4. The method of claim 3 wherein the salt is a salt of Ti.

5. The method of claim 4 wherein the salt is the ammonium salt of titanium (IV) and an aliphatic amine having a boiling point below 95° C. and the aqueous solution has a pH of 8-11.

6. The method of claim 5 wherein the salt is dimethylammonium titanate.

7. The method of claim 6 wherein the foil is immersed into an aqueous solution of dimethylammonium titanate.

8. The method of claim 7 wherein the aqueous solution contains about 0.001 to 1.00% of dimethylammonium titanate.

9. The method of claim 7 wherein the foil is immersed in the aqueous solution of the dimethylammonium titanate a plurality of times.

10. The method of claim 8 wherein the aqueous solution contains about 0.01% by weight of dimethylammonium titanate.

11. The method of claim 10 wherein the wetted foil is heated at a temperature of about 400° C.

12. The method of claim 2 wherein the foil is immersed in the aqueous solution of the salt.

13. The method of claim 12 wherein the foil is immersed in the aqueous solution of the salt a plurality of times.

14. The method of claim 13 wherein the salt is an ammonium salt of an aliphatic amine of a boiling point of less than 95° C.

15. The method of claim 14 wherein the salt is dimethylammonium titanate.

* * * * *